(12) United States Patent
Choi

(10) Patent No.: US 9,046,023 B2
(45) Date of Patent: Jun. 2, 2015

(54) CATALYTIC CONVERTER AND FABRICATION METHOD THEREOF

(75) Inventor: Sungmu Choi, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 624 days.

(21) Appl. No.: 13/313,997

(22) Filed: Dec. 7, 2011

(65) Prior Publication Data

US 2012/0321859 A1 Dec. 20, 2012

(30) Foreign Application Priority Data

Jun. 17, 2011 (KR) .................. 10-2011-0059211
Jun. 24, 2011 (KR) .................. 10-2011-0061774
Jun. 24, 2011 (KR) .................. 10-2011-0061775

(51) Int. Cl.
| | |
|---|---|
| B28B 11/04 | (2006.01) |
| B01D 46/00 | (2006.01) |
| F01N 3/28 | (2006.01) |
| B01D 46/24 | (2006.01) |
| B28B 11/00 | (2006.01) |
| F01N 3/022 | (2006.01) |

(52) U.S. Cl.
CPC ....... *F01N 3/2825* (2013.01); *Y10T 428/24744* (2015.01); *B01D 46/2459* (2013.01); *B28B 11/007* (2013.01); *F01N 3/0222* (2013.01); *Y02T 10/20* (2013.01)

(58) Field of Classification Search
CPC ............. B28B 11/007; B01D 46/0001; B01D 46/2459
USPC ................................................. 425/110, 127
See application file for complete search history.

(56) References Cited

U.S. PATENT DOCUMENTS

| | | | | | |
|---|---|---|---|---|---|
| 4,411,856 | A | * | 10/1983 | Montierth | 264/267 |
| 4,557,682 | A | * | 12/1985 | Montierth | 425/121 |
| 4,573,896 | A | * | 3/1986 | Bonzo | 425/125 |
| 4,576,774 | A | * | 3/1986 | Hazard et al. | 264/267 |
| 5,021,204 | A | * | 6/1991 | Frost et al. | 264/630 |
| 7,803,303 | B2 | * | 9/2010 | Hagg | 264/267 |
| 2003/0224933 | A1 | | 12/2003 | Kondo et al. | |
| 2008/0128082 | A1 | * | 6/2008 | Masuda et al. | 156/293 |
| 2009/0295009 | A1 | * | 12/2009 | Brown et al. | 264/46.6 |
| 2013/0300030 | A1 | * | 11/2013 | Mori et al. | 264/269 |

FOREIGN PATENT DOCUMENTS

| | | |
|---|---|---|
| JP | 61-293518 A | 12/1986 |
| JP | 2006-075724 A | 3/2006 |
| JP | 2008-55346 A | 3/2008 |

(Continued)

*Primary Examiner* — Robert B Davis
(74) *Attorney, Agent, or Firm* — Morgan, Lewis & Bockius LLP

(57) ABSTRACT

A catalyst unit may include a carrier, a channel opening portion through which exhaust gas passes, a skin portion that is formed along a circumference and integrally formed with the channel opening portion, and a skin addition portion that is formed with a second thickness on an outside surface of the skin portion. A fabrication device of the catalyst unit may include a container, a masking member, and an elastic member, wherein plugging material flows through opened channels and does not contact the masking member. A manufacturing method of the catalyst unit may include covering the masking member and inserting plugging material into an opened channel. A channel corresponding to a dead zone is plugged and the catalyst coating layer is not formed in the plugged channels, thus reducing the cost of the catalyst.

4 Claims, 17 Drawing Sheets

(56) References Cited

FOREIGN PATENT DOCUMENTS

| | | |
|---|---|---|
| JP | 2010-090838 A | 4/2010 |
| KR | 20-0425153 Y1 | 8/2006 |
| KR | 10-0684330 B1 | 2/2007 |
| KR | 10-2009-0112424 A | 10/2009 |

* cited by examiner

CATALYTIC CONVERTER AND FABRICATION METHOD THEREOF

CROSS-REFERENCE TO RELATED APPLICATION

This application claims priority to and the benefit of Korean Patent Application Nos. 10-2011-0059211, 10-2011-0061775, and 10-2011-0061774 filed in the Korean Intellectual Property Office on Jun. 17, 2011, Jun. 24, 2011, and Jun. 24, 2011, respectively, the entire contents of which applications is incorporated herein for all purposes by this reference.

BACKGROUND OF INVENTION

1. Field of Invention

The present invention relates to a catalyst unit that includes catalyst ingredients to reduce harmful materials of exhaust gas according to a flow characteristic.

2. Description of Related Art

In a vehicle, a three way catalyst converter is generally used to purify exhaust gas, which is disposed on an exhaust pipe, and the specifications thereof are different, because exhaust gas flow rates are different according to vehicles.

The three way catalytic converter simultaneously reacts harmful materials of exhaust gas such as carbon monoxide, nitrogen oxide, and hydrocarbon compound to eliminate these materials, and mainly Pt/Rh, Pd/Rh or Pt/Pd/Rh series is formed in the three way catalytic converter.

Meanwhile, a diesel vehicle that generates large amount of noxious exhaust gas is excellent in a fuel consumption efficiency and a power output, but nitrogen oxide and PM (particulate matters) are heavily included therein in contrast to a gasoline vehicle.

In the diesel vehicle like this, because intake air is sufficiently combusted in the most of driving condition, carbon monoxide and hydrocarbon is very little compared to the gasoline vehicle and nitrogen oxide and PM is heavily exhausted.

Recently, as a post process art, a diesel particulate filter research is very actively being undergone so as to correspond to the reinforced exhaust gas standard of the diesel vehicle, and there are many parts that are to be developed so as to apply the diesel particulate filter to a real vehicle.

Platinum is used in a coating layer of a Diesel Oxidation Catalyst (DOC), separately, Diesel Particulate Filter (DPF) is applied to a system of DOC+DPF, and CPF, which is recently being mass produced in a EU vehicle maker, and the reliability thereof increased the sales of the system.

And, a diesel particulate filter that a catalyst is coated thereon, which is called a diesel catalyzed particulate filter, has been developed. Meanwhile, several methods has been widely known for coating different kinds of catalyst on a cordierite carrier, and there are many prior arts.

For example, there is a dipping method that a cordierite carrier is dipped into catalyst solutions respectively having different concentrations and there is a suction method that one end side of a carrier is dipped into a catalyst solution and a vacuum pressure is formed in the other end side of the carrier to suck the catalyst solution through channels of the carrier.

Meanwhile, a noble metal is coated in the whole carrier regardless of flow characteristic of exhaust gas when manufacturing the catalyst carrier, wherein there is a problem that a noble metal is not efficiently used according to the flow characteristic of the exhaust gas.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a catalyst unit having advantages of decreasing a manufacturing cost by saving a noble metal.

A fabrication device of a catalyst unit that is used to partially close channels by a plugging material according to various aspects of the present invention may include a container that a plugging material is filled with, a masking member that is disposed on an upper side of the plugging material and contacts a part of a front surface of the carrier, and an elastic member that elastically supports the masking member in an upper direction, wherein the plugging material flows through opened channels that does not contact the masking member to close a part of channels.

One end of the elastic member may be connected to a bottom surface of the container and the other end thereof may be connected to a lower surface of the masking member.

An upper surface of the masking member may be formed to be flat corresponding to a front surface of the carrier.

The masking member may be disposed to contact a central portion except an edge portion of the front surface of the carrier.

The masking member may be disposed to be away from an upper surface of the plugging material by a predetermined distance.

A manufacturing method of a catalyst unit that uses a manufacturing device of a catalyst unit that includes a container having a plugging material, a masking member that is disposed at an upper portion of the plugging material, and an elastic member that elastically supports the masking member in an upper direction, may include inserting a front section of the carrier into the container such that a part of channels that are formed in a front surface of the carrier is closed by the masking member, lowering the carrier such that the elastic member is compressed by the carrier, and lowering the carrier to make the plugging material flow into opened channels that are not closed by the masking member by the carrier.

When the plugging material flows into the opened channels, the plugging material may be inserted as a predetermined length.

The manufacturing method may further include lifting the carrier such that the carrier is separated from the masking member, and hardening the plugging material that flows into the channel.

The manufacturing method may further include immersing the front section of the carrier in wash coat, in a condition that a part of the channels of the carrier is closed by the plugging material, and sucking the wash coat through the channels that are formed on the front surface to coat the wash coat on an inner surface of the opened channels.

When the opened channels are closed by the plugging material, the masking member may contact a central portion except an edge portion of the front surface of the carrier.

A manufacturing method of a catalyst unit according to various aspects of the present invention may include covering a masking member on a part of a front surface of a carrier, and inserting a plugging material into an opened channel except the covered portion by the masking member.

When the plugging material is inserted, a roller may be rolled along the front surface of the carrier and the plugging material that is smeared with the roller closes the inlet of the opened channel.

When the plugging material is inserted, a brush may be moved along the front surface of the carrier and the plugging material that is smeared with the brush closes the inlet of the opened channel.

The manufacturing method of a catalyst unit may further include eliminating the masking member, and hardening and drying the plugging material closing the opened channel.

The masking member may cover a central portion of the front surface of the carrier such that the opened channel can be positioned along an edge portion thereof.

A catalyst unit having a carrier according to various aspects of the present invention may include channel opening portion through which exhaust gas passes from a front surface to a rear surface, a skin portion that is formed along a circumference except the front surface and the rear surface with a first thickness and is integrally formed with the channel opening portion, and a skin addition portion that is additionally formed with a second thickness on an outside surface of the skin portion.

The first thickness may be thicker than the second thickness.

The skin addition portion may be formed as a material that is equal to that of the skin portion and the channel opening portion.

The skin addition portion may have an uniform thickness along the circumference direction and the channel is not formed from the front surface to the rear surface.

A manufacturing method of a catalyst unit according to various aspects of the present invention may include inserting a carrier into a die, a skin portion is integrally formed along the circumference of the carrier, filling skin material into a space that is formed between an interior circumference of the die and an exterior circumference of the carrier, removing the die in a condition that the skin material is fixed on the carrier, and forming an skin addition portion by heating the carrier and the skin material.

The skin portion that is formed on the circumference of the carrier may have a first thickness and a second thickness is formed between the exterior circumference of the skin portion and the interior circumference of the die.

The skin addition portion may be made of the material that is equal to that of the channel opening portion.

The skin addition portion may have a uniform thickness along the circumference direction thereof.

A skin material may be filled in a space between the interior circumference of the die and the exterior circumference of the carrier, and the skin material is hardened by pressurizing the skim material.

As described, the edge portion except the central portion of the front surface of the carrier is easily plugged in the catalyst unit and the manufacturing method thereof according to the present invention.

Further, the channel corresponding to dead zone that the exhaust gas hardly flow is plugged by plugs and the catalyst coating layer is not formed in the plugged channels. Accordingly, the cost of the catalyst can be saved, and the purification rate of the exhaust gas is securely maintained by closing the channels that the exhaust gas flow is less.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
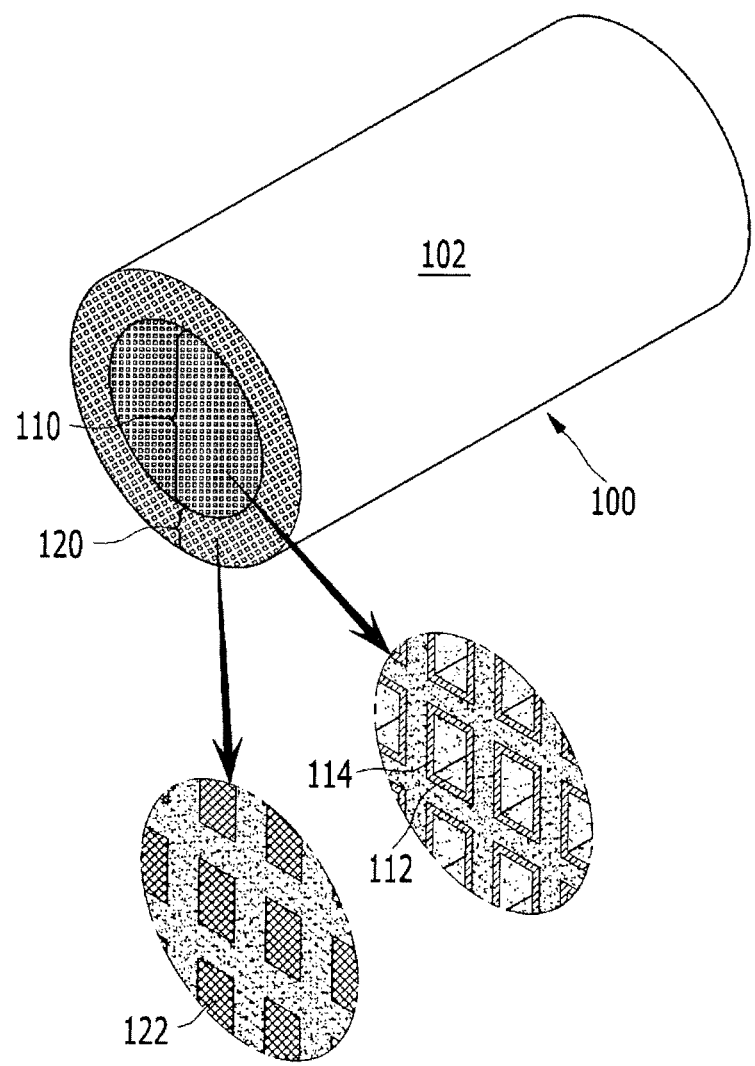
FIG. 1 is a schematic perspective view of an exemplary catalyst unit according to the present invention.

FIG. 1 is a schematic perspective view of a catalyst unit according to various embodiments of the present invention.

Referring to FIG. 1, a catalyst unit 100 includes a carrier 102.

The carrier 102 has an overall cylindrical shape, and channels 112 are formed from a front surface to a rear surface such that exhaust gas flows. In various embodiments of the present invention, the channel 112 is divided into two kinds, which includes a channel opened portion 110 that the inlet or the outlet thereof is opened and a channel plugging portion 120 that the inlet or the outlet thereof is closed.

The channel opened portion 110 has an opened inlet and an opened outlet of the channel 112 and the channel plugging portion 120 has a closed inlet or a closed outlet of the channel 112. Further, a catalyst coating layer 114 is formed on an inside surface of the channel opened portion 110 so as to reduce harmful material included in exhaust gas flowing the channel opened portion 110.

Figure 2:
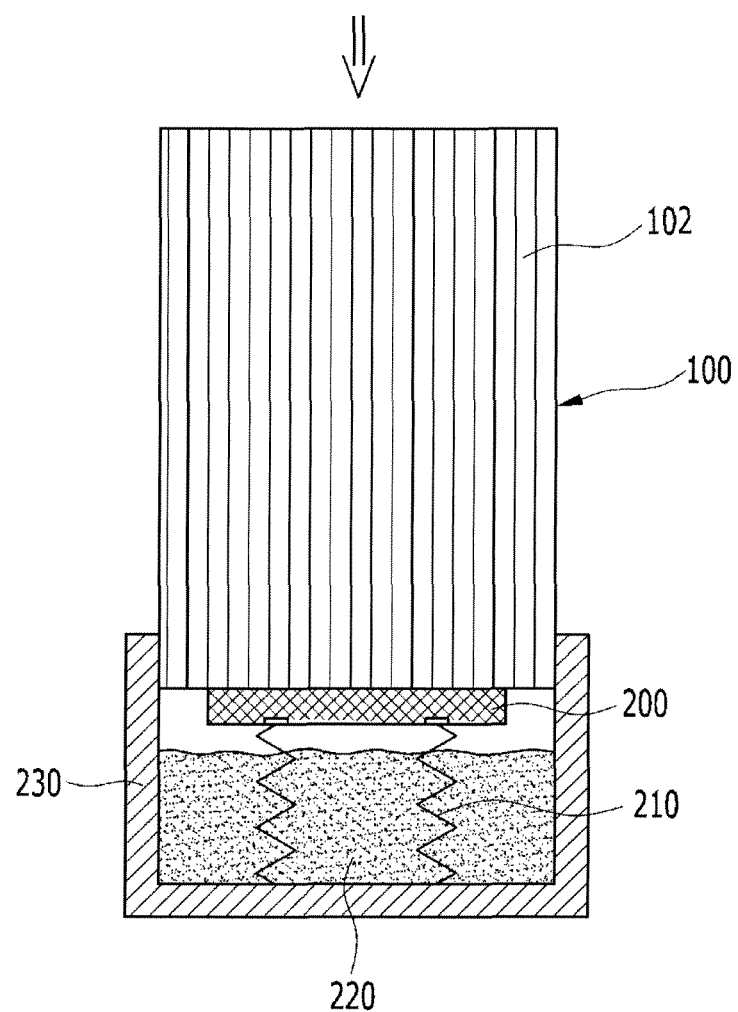
FIG. 2 is a schematic cross-sectional view of an exemplary manufacturing device of an exemplary catalyst unit according to the present invention.
Figure 3:
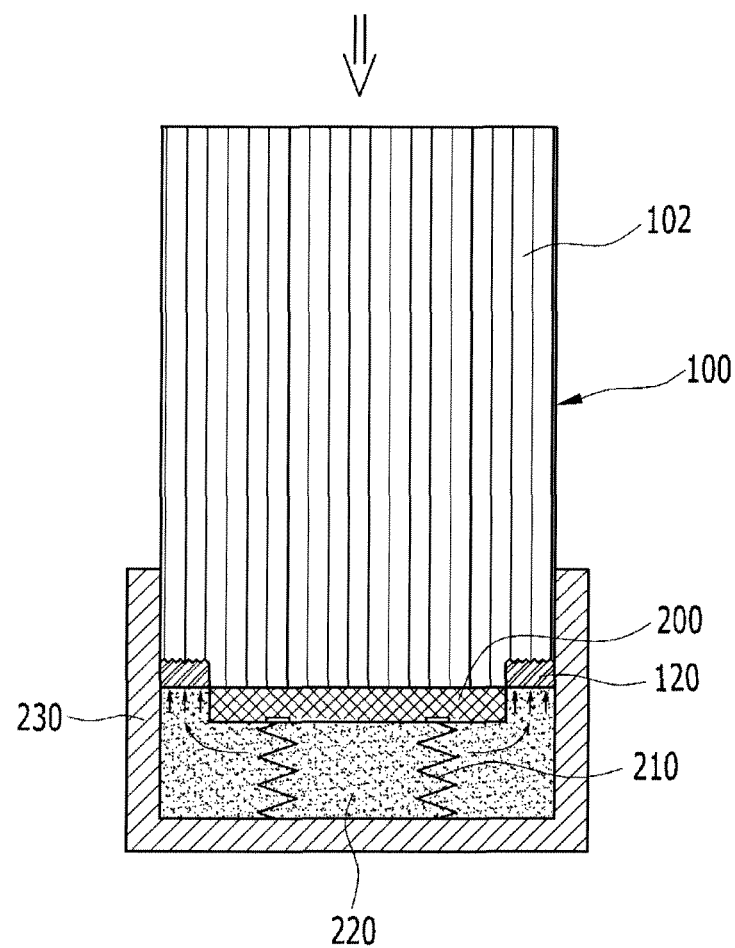
FIG. 3 is a schematic cross-sectional view showing an exemplary method forming an exemplary plugging portion according to the present invention.

As shown figures, the channel opened portion 110 is formed at a central portion of a front surface of the carrier 102, and the channel plugging portion 120 is formed along an edge portion except the central portion. Referring to FIG. 2 and FIG. 3, a manufacturing device and a method thereof will be described to form the channel plugging portion 120.

FIG. 2 is a schematic cross-sectional view of a manufacturing device of a catalyst unit according to various embodiments of the present invention.

Referring to FIG. 2, a manufacturing device for a catalyst unit 100 includes a container 230 that a plugging material 220 is filled therein, a masking member 200 that is disposed above an upper surface of the plugging material 220 with a predetermined distance, and an elastic member 210 that elastically supports the masking member 200 in an upper direction.

Here, a lower end portion of the elastic member 210 is fixed to an inner bottom of the container 230 and an upper end portion thereof is fixed to a lower surface of the masking member 20. Further, the elastic member 210 can be at least one to be able to support several portions of the masking member 200.

First, a front surface (a lower surface of FIG. 2) of the carrier 102 is inserted into an inner side of the container 230. And, the carrier 102 is moved in a lower side so that the upper surface of the masking member 20 contacts a central portion of the front surface of the carrier 102.

FIG. 3 is a schematic cross-sectional view showing a method forming a plugging portion according to various embodiments of the present invention.

Referring to FIG. 3, if the carrier 102 is further pushed in a lower side in a condition of FIG. 2, the elastic member 210 is compressed and the masking member 200 and the carrier 102 moves in a lower side, and the plugging material 220 that is filled in the container 230 flows into the inlet of the channel 112 that is formed along an edge portion of the front surface of the carrier 102. Further, the plugging material 220 does not flow into the channel 112 that is closed by the masking member 200.

As shown in FIG. 2 and FIG. 3, an upper surface of the masking member 200 has a flat shape corresponding to the front surface of the carrier 102. Further, a coil spring, a plate spring, etc. can be applied to the elastic member 210 and any structure can be applied the elastic member, if this elastically supports the masking member 200.

Figure 4:
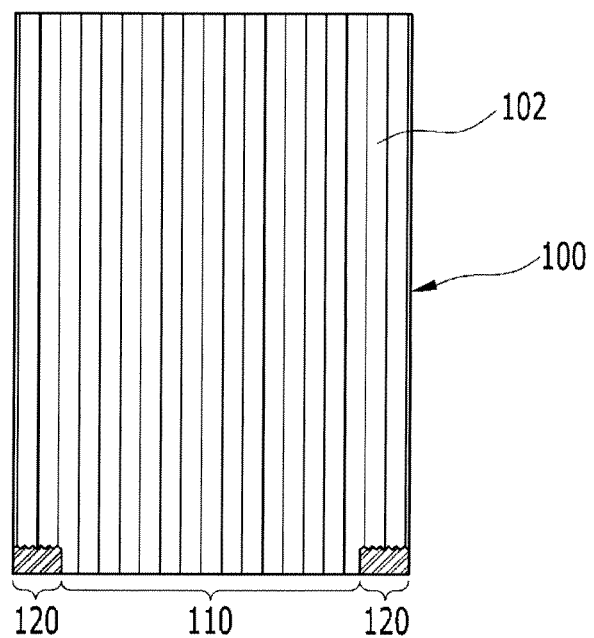
FIG. 4 is a schematic cross-sectional view of an exemplary carrier that is made by a manufacturing device of a catalyst unit according to the present invention.

FIG. 4 is a schematic cross-sectional view of a carrier that is made by a manufacturing device of a catalyst unit according to various embodiments of the present invention.

Referring to FIG. 4, if the carrier 102 is lifted in a condition of FIG. 3, the channel opened portion 110 corresponding to the masking member 200 is formed in the carrier 102 and the channel plugging portion 120 that the plugging material 220 inserted by a predetermined length is formed in the carrier 102.

Further, the plugging material 220 that closes a part of the channel is hardened by a heating or a drying process.

The channel plugging portion 120 can be formed on a front surface or a rear surface of the carrier 102 in various embodiments of the present invention.

Figure 5:
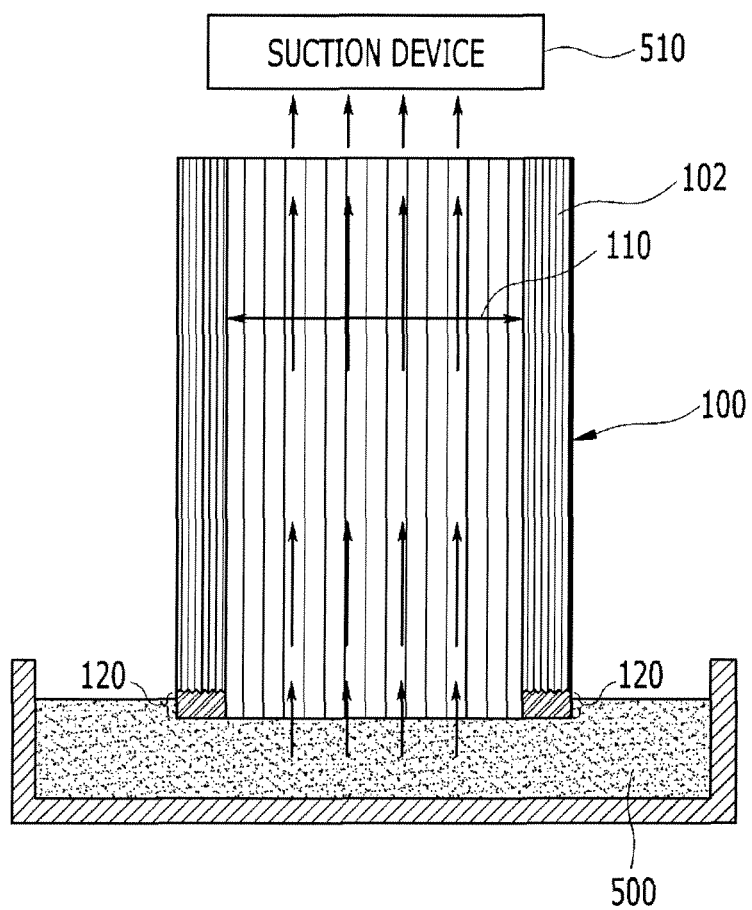
FIG. 5 is a schematic cross-sectional view showing an exemplary method for coating catalyst within a carrier that is made by a manufacturing device of a catalyst unit according to the present invention.

FIG. 5 is a schematic cross-sectional view showing a method for coating catalyst within a carrier that is made by a manufacturing device of a catalyst unit according to various embodiments of the present invention.

Referring to FIG. 5, a front side of the carrier 102 is dipped into a wash coat 500 in a condition that the channel plugging portion 120 is formed in the carrier 102. In this condition, the wash coat 500 is sucked by the suction device 510 through the channel opened portion 110.

The wash coat 500 that is inhaled through the channel opened portion 110 is coated on an inner surface of the channel 112 with a predetermined thickness, and the remaining wash coat runs down to be exhausted out of the carrier 102 by gravity.

The coated wash coat 500 that is formed in the carrier 102 is hardened by a drying or a heating process, as shown in FIG. 1, the catalyst coating layer 114 is formed.

Figure 6:
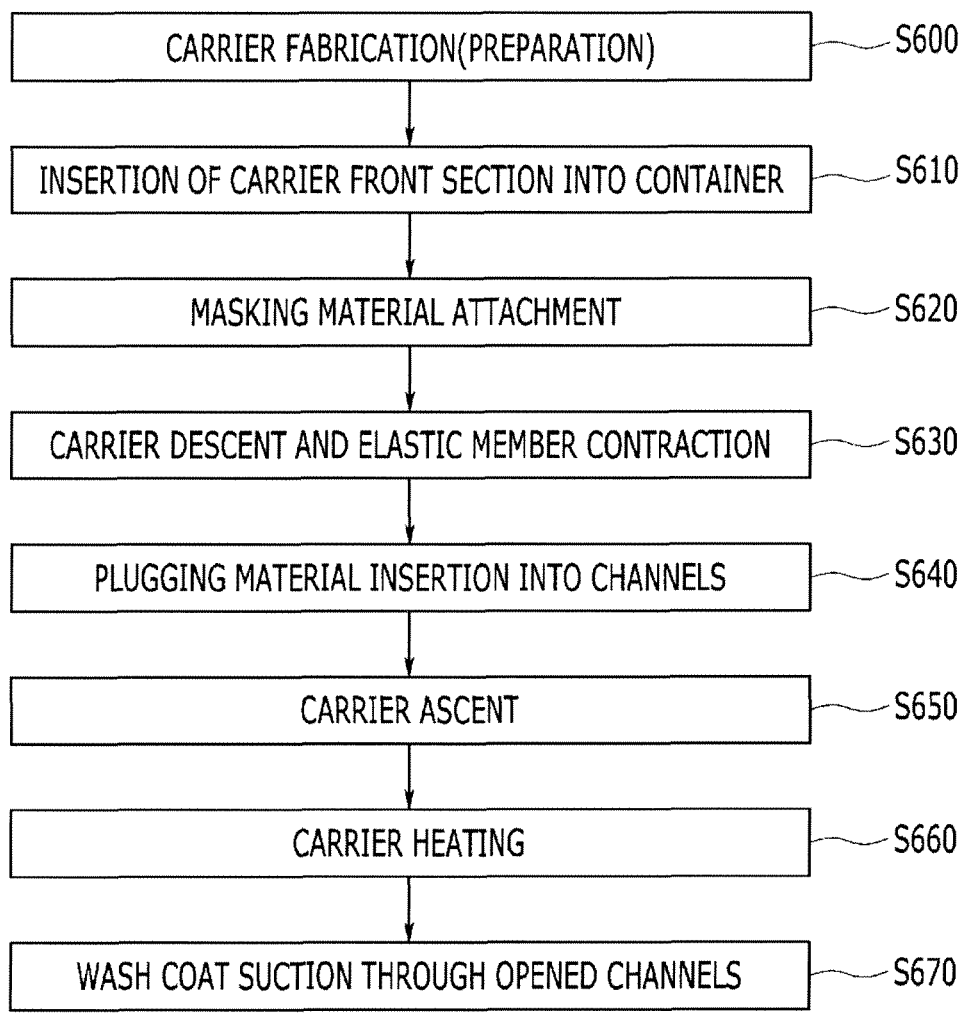
FIG. 6 is a flowchart showing an exemplary manufacturing method of a catalyst unit according to the present invention.

FIG. 6 is a flowchart showing a manufacturing method of a catalyst unit according to various embodiments of the present invention.

Referring to FIG. 6, a carrier 102 is manufactured or prepared in a S600

As described referring to FIG. 2 and FIG. 3, the front side of the carrier 102 is inserted into the container 230 in a S610.

And, the masking member 200 contacts the central portion of the front surface of the carrier 102 in a S620.

When the masking member 200 contacts the carrier 102, if the carrier 102 is pressed down, the carrier 102 moves down and the elastic member 210 is compressed in a S630.

The plugging material 220 flows as a predetermined length through a remained opened channel 112 except a portion that the masking member 200 is contacted in a S640.

In a S650, the carrier 102 is lifted when the plugging material 220 flows into the channel 112 of an edge portion of the carrier 102, and the carrier 102 is dried or heated to harden the plugging material 220 in a S660.

As shown in FIG. 5, the wash coat 500 is inhaled through the channel opened portion 110 in a S670, and the catalyst coating layer 114 is formed along an inside surface of the opened channel 112 through a drying or a heating process.

Figure 7:
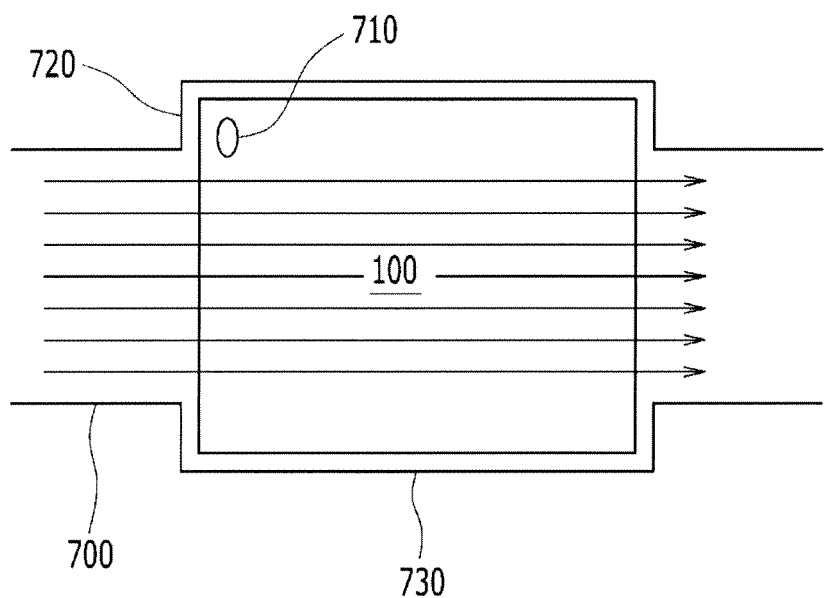
FIG. 7 is a schematic cross-sectional view showing an exemplary condition that a catalyst unit is disposed according to the present invention.

FIG. 7 is a schematic cross-sectional view showing a condition that a catalyst unit is disposed according to various embodiments of the present invention.

Referring to FIG. 7, a converter housing 730 is disposed on an exhaust line, and the catalyst unit (100, carrier) is disposed in the converter housing 730.

As shown, a converter cone portion 720 that the diameter thereof becomes larger is formed in the converter housing 730 around the exhaust line 700 and the edge portion of the catalyst unit 100 is supported by the converter cone portion 720.

Accordingly, a dead zone 710 corresponding to the converter cone portion 720 is formed in the catalyst unit 100, and the exhaust gas hardly flows the dead zone.

The plug 122 closes the inlet or the outlet of the channel that is formed along an edge of the carrier 100 corresponding to the dead zone 710 and the coating layer is not formed along the plugged channels in various embodiments of the present invention. Accordingly, the purification efficiency is not deteriorated and the catalyst material can be saved.

The carrier has a cylindrical shape in various embodiments of the present invention, but the carrier can be a shape having an oval type or a race track type.

Figure 8:
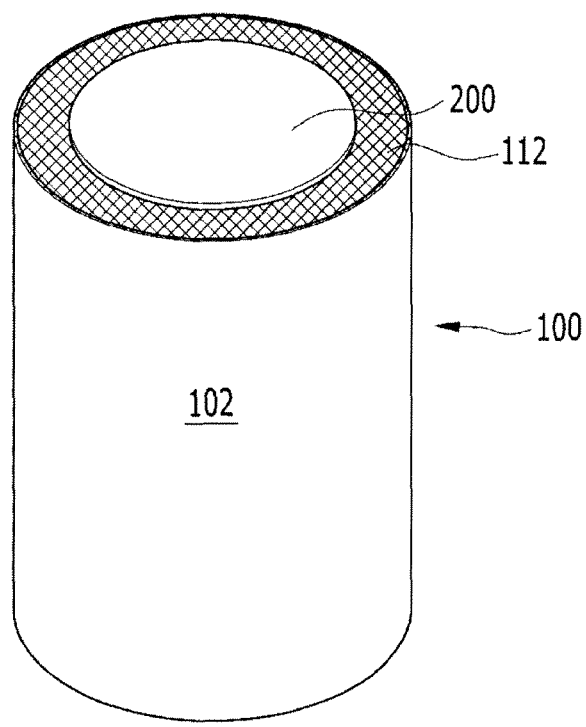
FIG. 8 is a perspective view showing an exemplary method for forming a channel plugging portion in a catalyst unit according to the present invention.

FIG. 8 is a perspective view showing a method for forming a channel plugging portion in a catalyst unit according to various embodiments of the present invention.

Referring to FIG. 8, the carrier 102 is prepared to fabricate the catalyst unit 100, wherein the channels 112 is formed from a front surface to a rear surface of the carrier 102. Here, the inlet and the outlet of the channels are all opened.

As shown, the masking member 200 covers the front surface of the carrier 102. Here, the masking member 200 is disposed at a central portion of a front surface of the carrier 102 and is not disposed along an edge portion thereof. Accordingly, the inlet of the channels 112 of the edge portion is opened.

Figure 9:
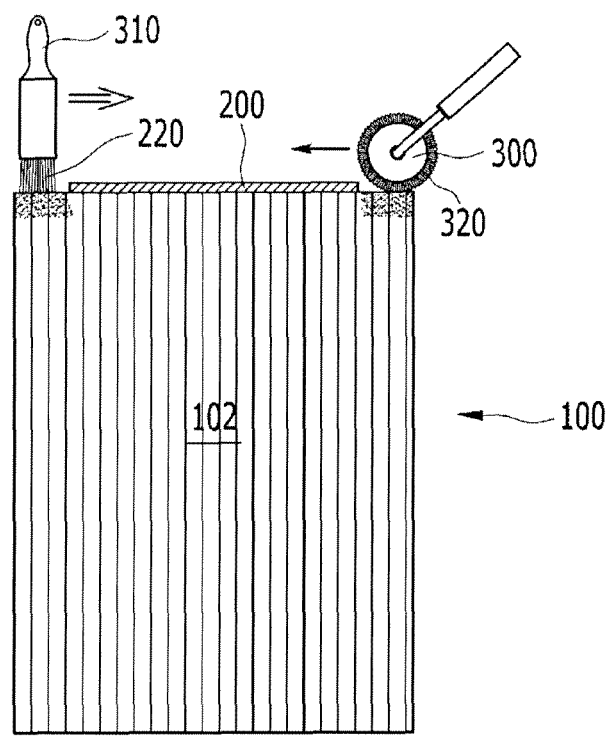
FIG. 9 is a side view showing an exemplary method for forming a channel plugging portion in a catalyst unit according to the present invention.

FIG. 9 is a side view showing a method for forming a channel plugging portion in a catalyst unit according to various embodiments of the present invention.

Referring to FIG. 9, the masking member 200 covers a front surface of the carrier 102 and the roller 300 is rolled along the front surface of the carrier 102. Here, a plugging material is attached on the roller 300, and the plugging material 220 flows into the opened channel 112 that the masking member 200 is not covered. Here, the plugging material 220 is a liquid type to adequately flow into the channel 112.

In various embodiments of the present invention, a brush 310 is used to spread the plugging material 220 on a front surface of the carrier 102. The plugging material 220 that is attached on the brush 310 flows into the opened channels 112 of the carrier 102.

Figure 10:
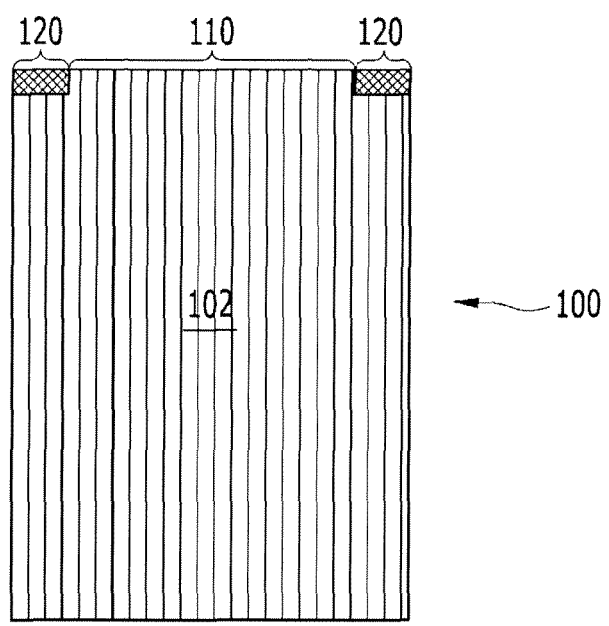
FIG. 10 is a schematic cross sectional side view of an exemplary catalyst unit according to the present invention.

FIG. 10 is a schematic cross sectional side view of a catalyst unit according to various embodiments of the present invention.

Referring to FIG. 10, if the masking member 200 is eliminated in FIG. 3, the channel opening portion 110 is formed in a central portion of a front surface of the carrier 102. Further, the channel plugging portion 120 is formed by the plugging material that is formed by the brush 310 or the roller 300 along an edge portion of a front surface of the carrier 100.

Figure 11:
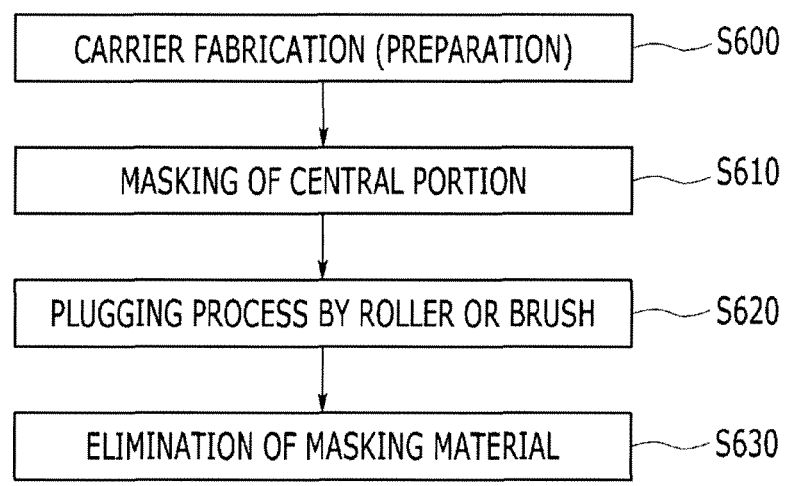
FIG. 11 is a flowchart showing an exemplary manufacturing method of a catalyst unit according to the present invention.

FIG. 11 is a flowchart showing a manufacturing method of a catalyst unit according to various embodiments of the present invention.

Referring to FIG. 11, the carrier 102 that the opened channels 112 are formed from a front surface to a rear surface thereof is prepared in a S600, and the masking member 200 is used to cover a central portion of a front surface thereof in a S610.

The roller 300 or the brush 310 is used such that the plugging material 220 plugs the channel 112 of an edge portion of the carrier 102 except the masking member 200 in a S620.

Further, the masking member 200 is removed in a S630, the plugging material 220 that is inserted into the channel 112 is hardened through a drying or a heating process, and the plug 122 of FIG. 1 is made thereby.

The carrier has a cylindrical shape in various embodiments of the present invention, but the carrier can be a shape having an oval type or a race track type.

Figure 12:
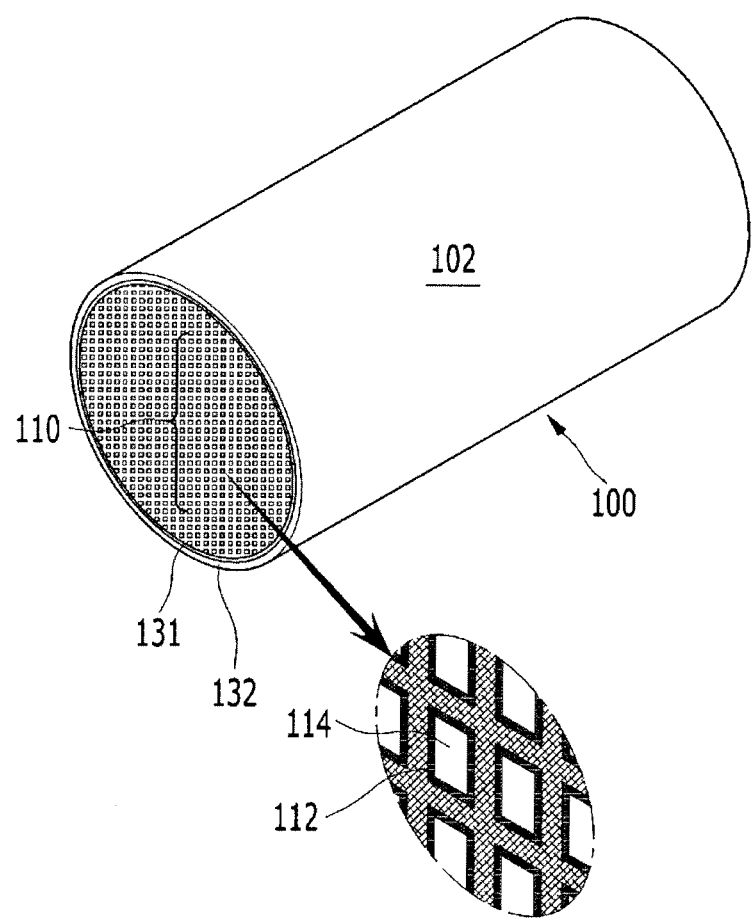
FIG. 12 is a schematic perspective view of an exemplary catalyst unit according to the present invention.

FIG. 12 is a schematic perspective view of a catalyst unit according to various embodiments of the present invention.

Referring to FIG. 12, the catalyst unit 100 includes a carrier 102.

The carrier 102 is prepared, wherein the channels 112 is formed from a front surface to a rear surface of the carrier 102. Further, the outer circumference of the carrier 102 except the front surface and the rear surface is surrounded by a skin portion 131 and a skin addition portion 132.

As shown, the skin portion 131 surrounds the outer circumference of the carrier 102, and the skin addition portion 132 surrounds the outer circumference of the skin portion 131, the thickness of the skin portion 131 is thicker than that of the skin addition portion 132, and the channels is not formed in the skin portion 131 and the skin addition portion 132 from a front surface to a rear surface.

Here, the skin portion 131 is formed by a material that is equal to that of the channel opening portion 110, and the skin addition portion 132 is formed on the skin portion 131.

If the channel opening portion 110 is expanded, the channel 112 that the inlet and the outlet thereof are all opened is formed and the catalyst coating layer 114 is formed on an inside surface of the channel. The exhaust gas flows into the inlet of the channel 112 to chemically react the catalyst coating layer 114 and the harmful material of the exhaust gas is reduced to be exhausted from the outlet of the channel.

Meanwhile, the channel opening portion 110 and the skin portion 131 are fabricated through an extrusion, a drying, and a heating, wherein the skin portion 131 has about 1 mm thickness, but if the skin portion 131 is thicker than 2 mm, the boundary between the channel opening portion 110 and the skin portion 131 can be cracked.

Accordingly, because the thickness of the skin portion 131 cannot be larger in an extruding process of the carrier 102 in various embodiments of the present invention, the skin addition portion 132 is further formed on the skin portion 131 considering a flow characteristic of exhaust gas and a durability of the carrier.

Further, the catalyst that is to be coated in an edge of the carrier 102 is not wasted unnecessarily by forming the skin addition portion 132, the exhaust gas hardly flow the edge portion of the carrier 102, and therefore the purification rate of the exhaust gas is uniformly maintained.

Figure 13:
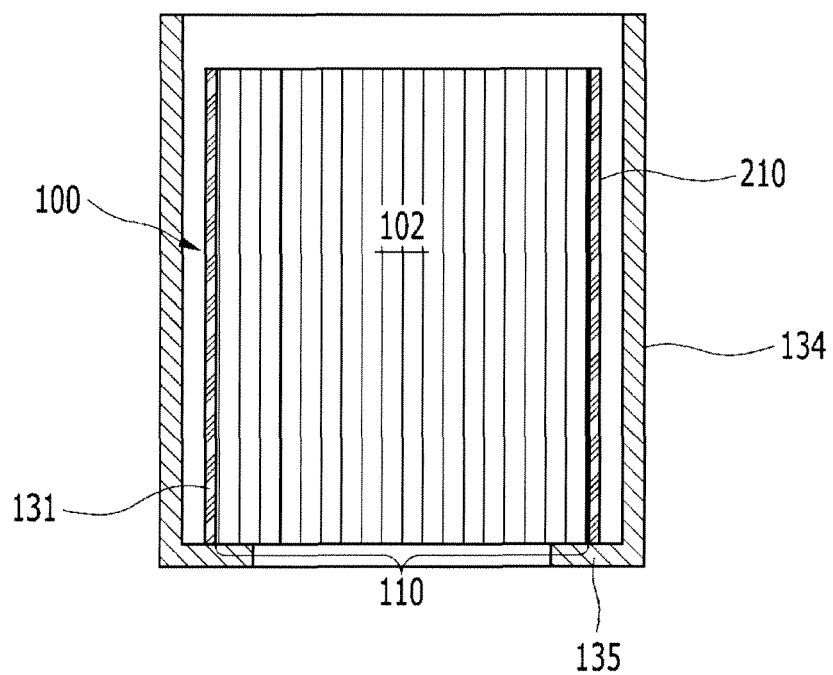
FIG. 13 is a cross sectional side view showing an exemplary condition that a carrier is disposed in a die so as to form a skin addition portion in a catalyst unit according to the present invention.

FIG. 13 is a cross sectional side view showing a condition that a carrier is disposed in a die so as to form a skin addition portion in a catalyst unit according to various embodiments of the present invention.

Referring to FIG. 13, the catalyst unit 100 includes a carrier 102 that the channel opening portion 110 and the skin portion 131 are formed therein, the carrier 102 is inserted into a die 133, and the carrier 102 is supported by a lower supporting portion 135 of the die 133.

Here, a space 134 is formed by a predetermined gap between an interior circumference of the die 133 and an exterior circumference of the carrier 102. And, a skin material 136 is filled in the space 134 to form the skin addition portion 132. The skin material 136 can be equal to the material forming the carrier 102. Accordingly, the skin material 136 can include a cordierite and a binder resin.

Figure 14:
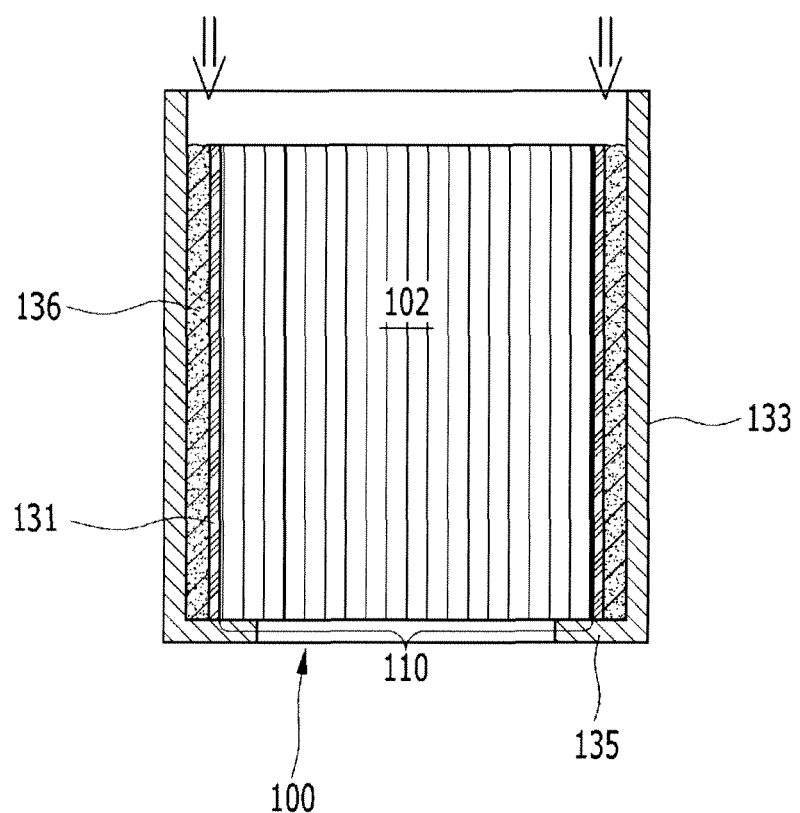
FIG. 14 is a cross sectional side view showing an exemplary condition that a skin material is disposed between a carrier and a die so as to form a skin addition portion on a catalyst unit according to the present invention.

FIG. 14 is a cross sectional side view showing a condition that a skin material is disposed between a carrier and a die so as to form a skin addition portion on a catalyst unit according to various embodiments of the present invention.

Referring to FIG. 14, a skin material is filled in the space 134 between an interior circumference of the die 133 and the filled material is securely pressurized.

As shown, the skin portion 131 has a first thickness d1 of 1 mm, and the skin material 136 that is filled between the die and the skin portion 131 has a second thickness d2 that is thicker than the first thickness d1.

In various embodiments of the present invention, the skin material 136 includes a cordierite material and a binder, bubble is included in the skin material 136, but the bubble is eliminated by the pressurization process.

Figure 15:
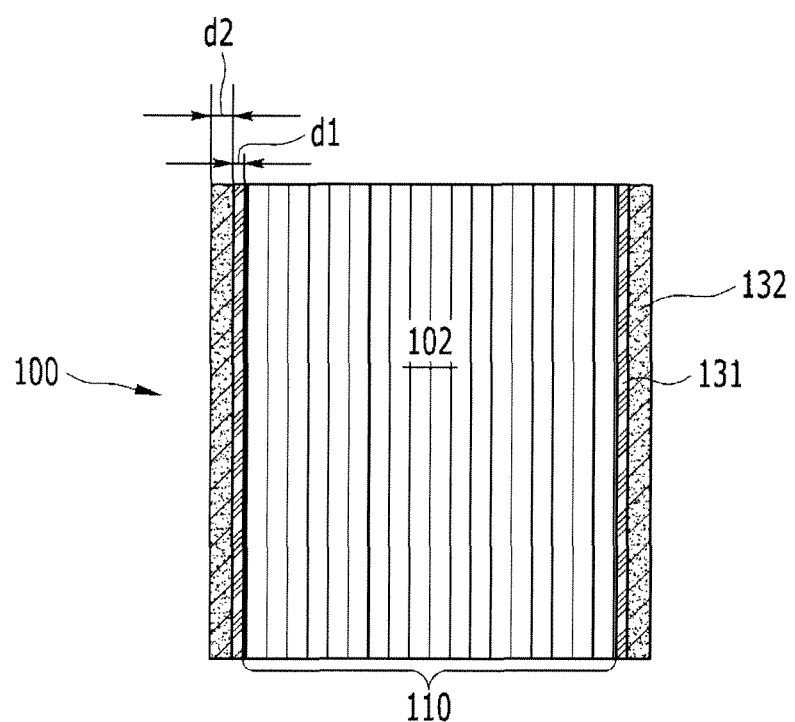
FIG. 15 is a cross sectional side view showing an exemplary condition that a skin addition portion is formed in a catalyst unit according to the present invention.

FIG. 15 is a cross sectional side view showing a condition that a skin addition portion is formed in a catalyst unit according to various embodiments of the present invention.

Referring to FIG. 15, if the die 133 is eliminated and the carrier 102 is dried and heated, the skin addition portion 132 is formed on the skin portion 131.

As shown, the skin portion 131 has a first thickness d1, and the skin addition portion 132 has a second thickness d2. In various embodiments of the present invention, the skin portion 131 has a thickness about 1 mm and the skin addition portion 132 has a thickness about 4 mm, wherein it is desirable that the skin addition portion 132 has a thickness at least 2 mm.

Figure 16:
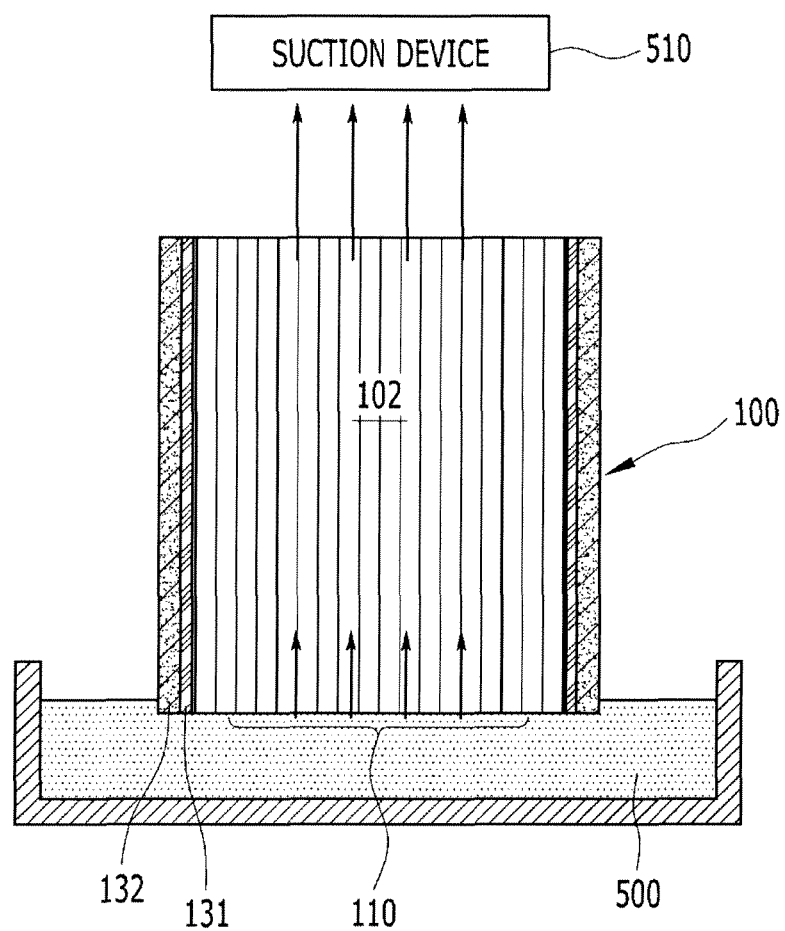
FIG. 16 is a cross sectional side view showing an exemplary method for forming a catalyst coating layer in a catalyst unit according to the present invention.

FIG. 16 is a cross sectional side view showing a method for forming a catalyst coating layer in a catalyst unit according to various embodiments of the present invention.

The front portion of the carrier 102 that the skin portion 131 and the skin addition portion 132 are formed is dipped into wash coat 500, and a suction device 510 that is disposed at an opposite side thereof sucks the wash coat 500 through 510. Accordingly, the catalyst coating layer 114 is formed inside each channel 112 of the channel opening portion 110.

Figure 17:
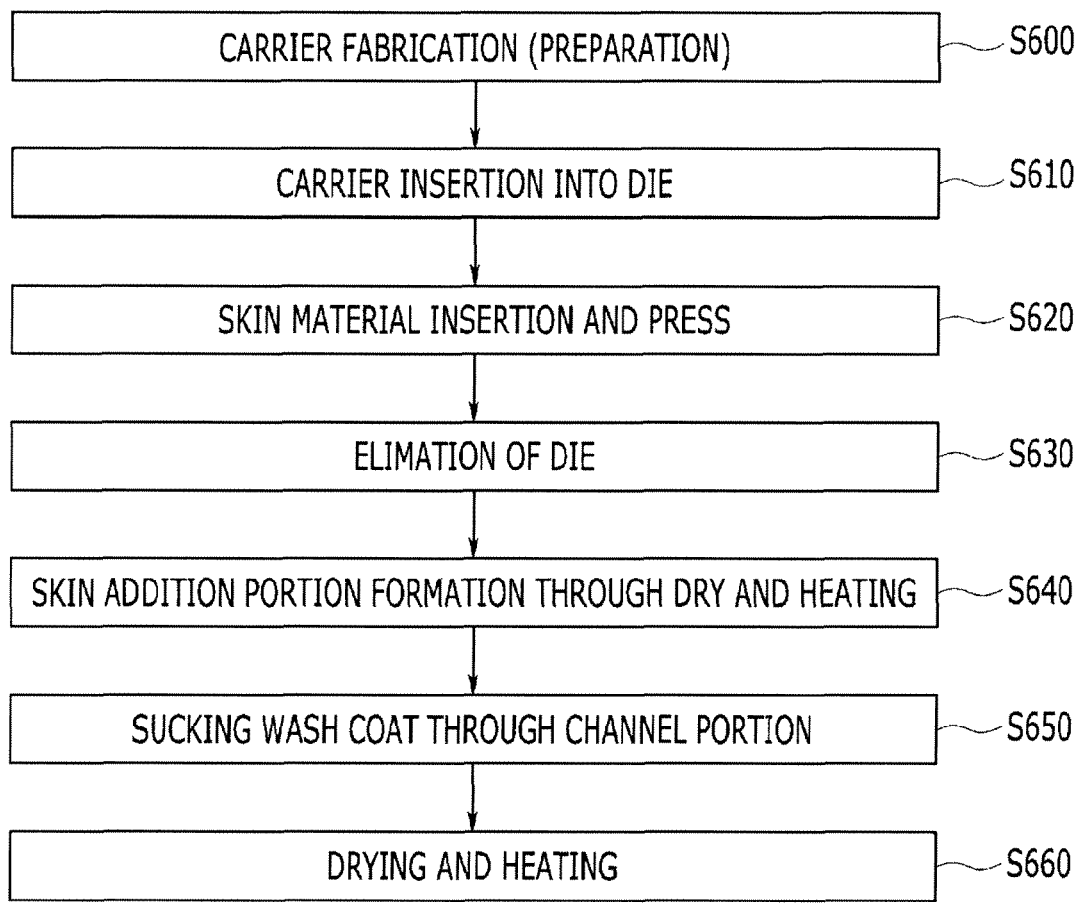
FIG. 17 is a flowchart showing an exemplary manufacturing method of a catalyst unit according to the present invention.

FIG. 17 is a flowchart showing a manufacturing method of a catalyst unit according to various embodiments of the present invention.

Referring to FIG. 17, a carrier 102 is prepared in a S600. A cordierite dough is extruded, dried, or heated to be the carrier 102 and the skin portion, wherein the carrier 102 is integrally formed with the skin portion 131.

The carrier 102 is disposed in the die 133 in a S610, and the skin material 136 is filled and pressurized in a S620. Further, the die 133 is removed in a S630, and the skin addition portion 132 is formed through a drying and a heating process in a S640.

Further, the wash coat 500 is inhaled through the channel opening portion 110 in a S650, and the catalyst coating layer 114 is formed through drying and heating in a S660.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fabrication device of a catalyst unit used to partially close channels with a plugging material, the fabrication device comprising:
    a container filled with a plugging material;
    a masking member disposed on an upper side of the plugging material and contacting a part of a front surface of the carrier; and
    an elastic member that elastically supports the masking member in an upward direction, wherein the plugging material flows through opened channels that do not contact the masking member, and
    wherein one end of the elastic member is connected to a bottom surface of the container and another end thereof is connected to a lower surface of the masking member.

2. The fabrication device of a catalyst unit of claim 1, wherein an upper surface of the masking member is flat.

3. The fabrication device of a catalyst unit of claim 1, wherein the masking member is disposed to contact a central portion of the front surface of the carrier without contacting an edge portion of the carrier.

4. The fabrication device of a catalyst unit of claim 1, wherein the masking member is disposed away from an upper surface of the plugging material by a predetermined distance.

* * * * *